Figure 4:
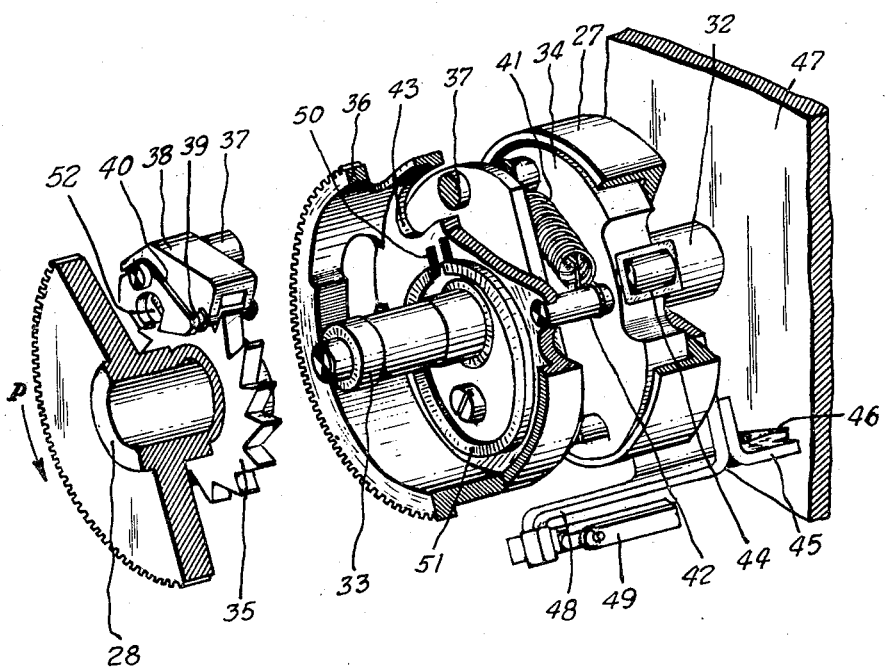

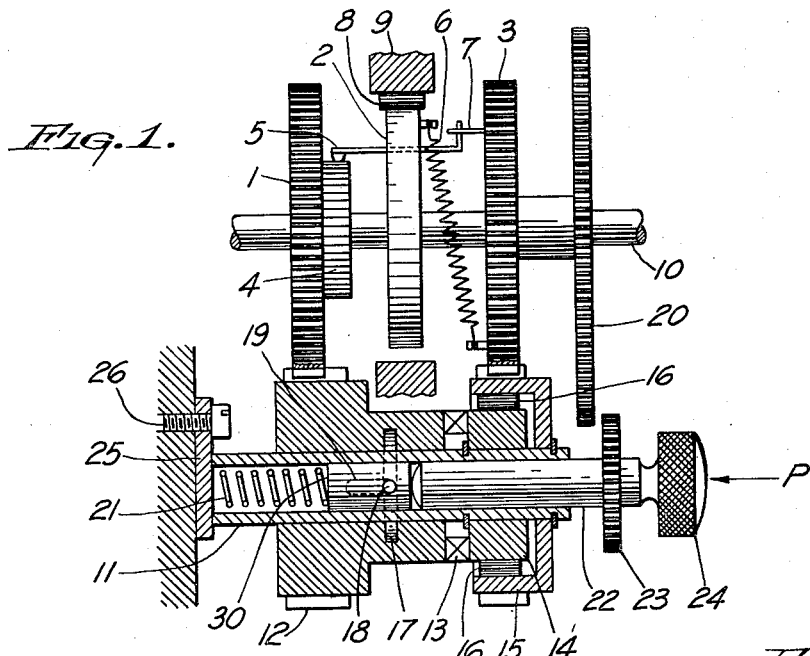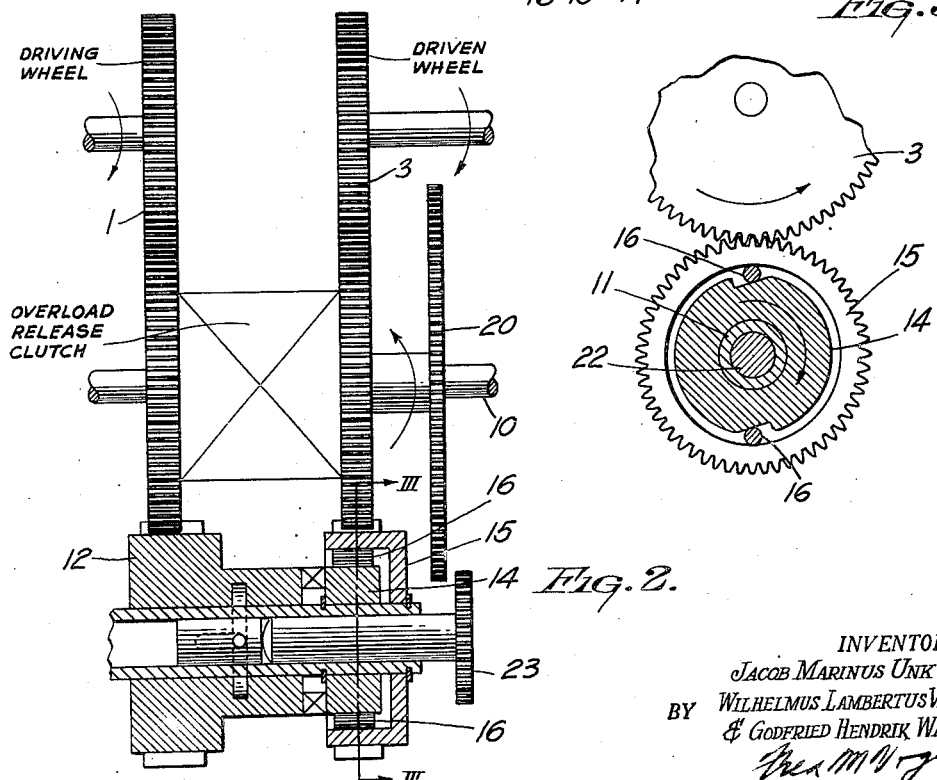

Feb. 25, 1958　　J. M. UNK ET AL　　2,824,637
TRANSMISSION DEVICE COMPRISING AN AUTOMATICALLY
OPERATING OVERLOAD-RELEASE CLUTCH
Filed Aug. 7, 1951　　3 Sheets-Sheet 2

*INVENTOR.*
JACOB MARINUS UNK
WILHELMUS LAMBERTUS VERVEST
GODFRIED HENDRIK WAARLE
BY
AGENT

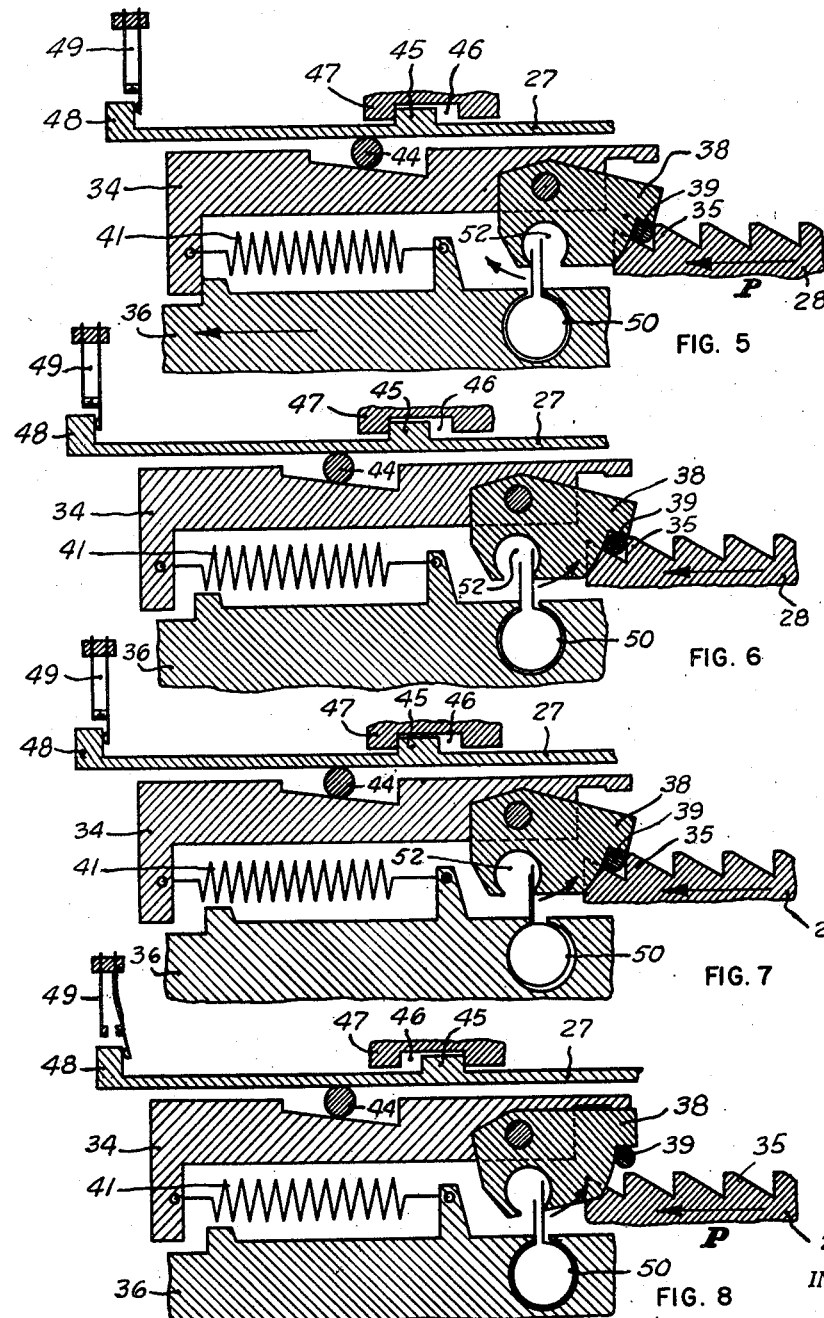

United States Patent Office 2,824,637
Patented Feb. 25, 1958

2,824,637

TRANSMISSION DEVICE COMPRISING AN AUTOMATICALLY OPERATING OVERLOAD-RELEASE CLUTCH

Jacob Marinus Unk, Wilhelmus Lambertus Vervest, and Godfried Hendrik Waarle, Hilversum, Netherlands, assignors, by mesne assignments, to North American Philips Company, Inc., New York, N. Y., a corporation of Delaware Application August 7, 1951, Serial No. 240,754

Claims priority, application Netherlands August 30, 1950

5 Claims. (Cl. 192—150)

Automatically operating overload-release clutches are known in which the driven part, after the clutch has been disengaged completely by overload, continues to be subjected to a driving force operating in the direction of the movement followed prior to disengagement. Such a clutch may be realized for example, to comprise an auxiliary member which transmits the driving force and which is connected to the driven part by means exercising an elastic force and which is coupled to the driving part via a disengageable coupling (driving coupling). The latter is disengaged in the case of a relative displacement of the auxiliary member relative to the driven part which displacement follows upon overload, and is reengaged when, for example, by release of the overload, the driven part and the auxiliary member resume their original relative position. In order to prevent the auxiliary member from retracting under the influence of the elastic force, upon disengagement of the driving coupling, provision is made of a coupling between the auxiliary member and a stationary part of the clutch which coupling is operative when the driving coupling is disengaged.

The invention relates to a transmission device which comprises a clutch of the kind mentioned in the opening part.

It has been found that in several uses of such a transmission device, a difficulty may arise. After the clutch has been disengaged as a result of overload, a driving force continues to act on the driven part. When the overload is released, this driving force actuates the driven part together with the parts driven via the transmission device. If this ensues suddenly and if their inertia is not excessive they may attain a speed higher than the normal speed. This may be responsible for a temporary unbalanced running of the driven parts, which is undesirable with selector switches for automatic telephony and with shaft-positioning mechanisms comprising co-operating stop discs and stopping pawls.

The invention provides means to remedy this fault.

The transmission device according to the invention is distinguished by the feature that its driving part and driven part are coupled not only by the clutch but also by a one-way coupling which automatically arrests movement of the driven part relative to the driving part in the direction of movement for which the clutch is actuated when overload occurs.

The one-way coupling prevents the driven part of the transmission device from attaining a speed which is higher than that which corresponds to the speed of the driving part. So long as the speed of the driven part is lower than or equal to that corresponding to the driving part the one-way coupling is inoperative and interferes in no way with the operation of the transmission device. The one way coupling may be a claw coupling but preferably it is constituted by a free wheel coupling comprising grip rollers or grip balls since the latter coupling has the advantage of exhibiting substantially no back lash.

It may be desirable for the driven part to be adapted to be reset relative to the driving part. If in the clutch the coupling between the auxiliary member and a stationary part is constituted by an automatically operating and direction coupling, for example a grip roller coupling, it has the effect, at a standstill of the transmission devices, of preventing movement of the driven part in the return direction. The one-way coupling which according to the invention links the driving part to the driven part of the transmission device prevents movement in the forward direction. According to the invention, for this reason an interruptable coupling is preferably incorporated in series with the one-way coupling. This interruptable coupling can be disengaged when, at a standstill of the driving part of the transmission device, the driven part is to be reset in the forward direction and is realized preferably as a claw coupling one half of which can be displaced against resilient pressure so as to be brought out of engagement with the other half.

Fig. 1 illustrates a partially sectional and partially elevational view of the device embodying our invention. Fig. 2 is another view of said embodiment partially diagrammatical and partially in longitudinal section. Fig. 3 is a view taken along the line 3—3 of Fig. 2. Fig. 4 is a perspective view of one form of the invention with some parts removed and others in partially exploded relationships. Figs. 5–8 inclusive illlustrate diagrammatically the various relationships of parts during complete operation of the device of Fig. 4.

Referring more particularly to Figs. 1–3 and wherein like parts bear the same reference numerals the various parts of the automatically operating clutch are supported from a stationary shaft 10. Journalled on this shaft are from left to right a toothed wheel 1 which constitutes the driving part of the transmission device and also constitutes the driving part of the clutch, an auxiliary member 2 and a toothed wheel 3 which constitutes the driven part of the transmission device and also the driven part of the clutch. Rigidly connected to the toothed wheel 1 is a ratchet whel 4 with which a pawl 5 is adapted to engage. The pawl 5 is supported from the auxiliary member 2 which is linked to the wheel 3 by one or more tensioned springs 6. The wheel 3 supports control means for the pawl 5, which is shown diagrammatically by a stud 7. Stud 7 when in the normal drive position of the transmission device does not engage pawl 5 however upon overload wheel 3 moves relative to auxiliary member 2 thereby causing stud 7 thereon to engage pawl 5 thereby lifting pawl 5 from engagement with ratchet wheel 4. Thus, uncoupling of the driven shaft with the drive shaft is accomplished upon a predetermined overloading of the driven shaft. In the case of relative rotation between the auxiliary member and the wheel 3, as in the case of overload of the latter wheel, pawl 5 is lifted from the ratchet wheel 4. Backward rotation of the auxiliary member 2, which in this case is subjected to the action of the springs 6 alone, is prevented by a ratchet gear coupling comprising grip rollers 8. These grip rollers are enclosed between the profiled periphery of the auxiliary member 2 and a cylindrical contact surface of a housing 9 of the mechanism, which part is arranged axially with the auxiliary member.

Upon suppression of the overload of the wheel 3 positive coupling is automatically obtained and the wheel 3 is driven by the springs 6 in the preceding direction of movement. The wheel 3 thus moves to the position it originally occupied in relation to the auxiliary member and this results in the control means 7 moving the pawl 5 again into engagement with the ratchet wheel 4. The driving link between the driving part and the driven part is thus re-established. The wheel 3 has also linked to it a toothed wheel 20 which is used in a manner described more fully hereinafter for fine adjustment of the wheel 3 and the parts to be driven thereby.

A cylindrical sleeve member 11 is rigidly mounted in position at the side of the shaft 10 and parallel therewith. The said sleeve 11 supports a rotatable toothed wheel 12 which is adapted to move in the direction of length of the sleeve and which meshes with the wheel 1. The wheel 12 is linked via a claw coupling 13 to a member 14 which is adapted to rotate about the sleeve 11. This member is arranged with a bowl-shaped cavity of a toothed wheel 15, which is also adapted to rotate about the sleeve 11 which meshes with the toothed wheel 3. The member 14 and the toothed wheel 15 are separated by grip rollers 16 which jointly with the cylindrical inner surface of the wheel 15 and the inclined bottom of recesses provided in the periphery of the member 14, constitutes a ratchet gear coupling. This coupling permits the wheel 15 to lag behind the member 14 but prevents it from catching up therewith. Thus, the wheel 3 is also prevented from running faster than the wheel 1 at any time.

The toothed wheel 12 is provided with an internal annular slot 17 into which is thrust a stud 18 which extends through two oppositely arranged elongated apertures 19 in the wall of the sleeve 11. The stud 18 is rigidly secured to a sliding piece 30 which is enclosed within the sleeve 11 and is forced to the right by a spring 21. Through the co-operation of the stud 18 with the wall of the slot 17 in the toothed wheel 12 the latter is kept forced to the right so that the two halves of the claw coupling which separates the wheel 12 and the member 14 are in engagement. A shaft 22 can be inserted in the righthand end of the sleeve 11. Seated on this shaft are a toothed wheel 23 and a hand-control knob 24. Pressing the knob 24 to the left (arrow) enables the toothed wheel 23 to be brought into engagement with a larger toothed wheel 20 which is linked to the wheel 3 of the clutch. The depression of the shaft 22 has the effect owing to the displacement of the sliding piece 30, of shifting the toothed wheel 12 to the left via the stud 18, with the result that the two halves of the claw coupling 13 are disengaged. Rotation of the knob 24 enables the wheel 3 and the parts driven thereby to be adjusted by hand without the arresting effect of the ratchet gear coupling between the toothed wheel 15 and the member 14 being convenient when the wheel 3 is not in motion the toothed wheels 12 and 15 and member 14 of the present device rotate under normal conditions in a clockwise direction and at equal speed as viewed from the left of Fig. 1. However, when the driven part 3 of the clutch is overloaded, the driven part is retarded in relation to the driving part of the clutch, thus the member 14 rotates in a clockwise direction with respect to cup-shaped wheel 15 geared to driven part 3. Grip rollers 16 between member 14 and cup-shaped wheel 15 permit a clockwise rotation of member 14 in relation to cup-shaped wheel 15, but on the other hand prevent the clockwise rotation of cup-shaped wheel 15 in relation to member 14. Thus the driven part 3 of the clutch cannot rotate in a counter clockwise direction.

As may be seen from the figure, the toothed wheels 12 and 15 and the other parts which constituted a separate link between the driving part and the driven part of the automatically operating clutch are supported by the sleeve 11. The aggregate is realized so as to form a separate structural unit which is mounted at the side of the clutch by means of one or more securing screws 26 which pass through apertures in a side piece 25 of the sleeve 11.

According to the drawings the reference numeral 32 of Fig. 4 denotes the stationary control shaft of the device. The driving shaft wheel 28 is journalled around the control shaft with the toothed wheel 4 connected thereto. The auxiliary member 34, the cup-shaped wheel 35 constituting the driven shaft and the housing 27 are freely rotatable about the control shaft. For the sake of clarity the driving shaft 28 is represented separately. The auxiliary member 34 is coupled with the toothed wheel 35 by means of a pawl which is pivoted on the pin 37 carried by the auxiliary member. The pawl consists of a gutter-shaped ratchet lever 38 carrying a roller 39. The roller 39 is pressed on the edges of the sides of the ratchet lever and the central part of the roller 39 co-operates with the toothed wheel 35. The ends of the roller 39 are caught by the spring 40 secured to the ratchet lever. The auxiliary member 34 is coupled with the wheel 36 through the intermediary of the tensioned spring 41, one end of which embraces the pin 37, whereas the other end is held by the pin 42 which is secured in the bottom of the wheel 36. The latter exhibits an aperture 43 through which extends the pin 37 and which permits a relative rotation between the auxiliary member 34 and the output shaft 36 whereby the spring 41 is further stretched. Complete relaxation of spring 41 is prevented, since the pin 37 is arrested by a not represented part of the edge of the aperture 43.

The auxiliary member 34 is provided at its periphery with a number of recesses each of which contains a grip roller 44. These grip rollers function as a coupling acting only in one direction of rotation between the auxiliary member 34 and the edge of the housing 27 embraces this auxiliary member. The housing 27 has rigidly secured to it the lug 32 which extends in the recess 34 of the stationary plate 36 in which the shaft 10 is supported. Owing to this the housing 27 is adapted to move around the shaft 32 only through a stroke determined by the cooperation between the lug 45 and the edges of the recess 46. To the housing 27 is also secured the arm 48, the end of which cooperates with one of the contact springs of electrical contact device 49. The driven shaft 36 comprises a spring 50 shaped as a wire or band which surrounds the shaft 32 and of which the ends extend in a radial direction, whereas the remaining part is stored in the hollow edge 51 provided on the shaft 36. The free ends of the spring 50 co-operate with the edge of one of the apertures 52 provided in the side walls of ratchet lever 38 as will be set out in the following:

For explaining the operation of the device the latter is represented diagrammatically in Figs. 5 to 8, it being supposed, for the sake of clarity, that the separate members of the device perform a sliding movement instead of a rotating movement. The principle on which the invention is based is not affected thereby. In the following the expression "moments" will be used to bring out the applicability to the rotating movement though in conjunction with the imagined sliding movement the expression "forces" would be better. Any parts corresponding to these shown in Fig. 4 bear the same reference numerals.

In the position shown in Fig. 5, which corresponds to that shown in Fig. 4, the pawl 38 meshes with the toothed wheel 35. On the driving shaft 28 being moved in the direction indicated by the arrow $P_1$ the auxiliary member 34 is carried with and its movement is transmitted to the driven shaft 36 through the spring 41, the ratchet lever 38 and the roller 39 being compelled to cooperate with the toothed wheel 35 due to pressure exerted by the lefthand free end of the spring 50 on the edge of the aperture 52. The bottom of the recesses in the edge of the auxiliary member 36 containing the grip roller 44 extends in a manner such that in the direction of movement in question the auxiliary member is not coupled with the housing 27. The remaining slight friction provides that the housing occupies the extreme lefthand position which is adapted to occupy in connection with the abutment of the lug 45 against the edge of the recess 46. In this position of the housing 27 the contact device 49 is closed. The spring 41 is steadily given a preliminary tension by the stop (shown in Fig. 5 at the left) between the auxiliary member and the driven shaft 36, the operation of which stop corresponds with abutment of the pin 37 against the edge of the aperture (Fig. 4). As long as the driving moment remains smaller than the moment exerted by the preliminary tension of the spring, the relative positions of the auxiliary member 34 and the driven shaft 36 do not alter. If, however, the latter is overloaded or arrested, the auxiliary member 34 will leave the stop on the driven shaft and the spring 41 will be further stretched. The driven shaft 36 comes to a standstill, whereas the auxiliary member is further driven by the shaft 28. The point of application of the force exerted by spring 50 on the pawl 38 is shifted and at the same time this force reverses its direction, since, as shown in Fig. 6, the right free end of spring 50 engages the ratchet lever due to the relative movement of the auxiliary member and the driven shaft. The spring 50 tends to lift the pawl but does not succeed therein owing to the pressure exerted by the gear wheel 35 on the roller 39. The driving of the auxiliary member is as yet maintained, with the result that the relative displacement of the auxiliary member and the shaft 36 is increased until the other end of spring 50 also exerts pressure on the ratchet lever (Fig. 7). This results in that upon the auxiliary member 34 being further driven, the pressure exerted on the ratchet lever is sufficient for lifting the pawl the roller 39 passing both over the flank of the engaging tooth of the gear wheel 35 and over the sides of the ratchet lever 38 until the connection between the auxiliary member of the driving shaft 28 is completely broken. After that the auxiliary member only experiences a moment from the stretched spring 41 which tends to urge the member back. As soon, however, as such a movement begins the grip roller 44 seizes between the auxiliary member and the inner wall of the housing 27 due to which the housing is compelled to follow the returning auxiliary member. This is possible, since the lug 45 is movable in the recess 46 but only until it is arrested by the right-hand wall of the recess. At this moment the return of the housing 27 and consequently of the auxiliary member 34 coupled therewith by the grip roller 44 is terminated. The position then occupied is shown in Fig. 8. The return of the auxiliary member is terminated before the stretched spring 41 relaxes to its initial length so that a driving movement remains exerted on the driven shaft 31. The pawl 38 remains lifted, since although upon return of the auxiliary member the pressure exerted by the left end of spring 50 on the edge of the ratchet lever 38 has ceased, the right end of the spring exerts sufficient force to keep the ratchet lever upright. Upon the gear wheel 36 being released the roller 39 is caused to resume its initial position with respect to the ratchet lever 38 by the spring 40 shown in Fig. 4.

On the housing 27 being moved after actuation of the grip roller 44, the contact between the contact springs of the electrical contact device 49 is broken, since the arm 48 connected to the housing 27 has carried with it one of these springs. As the auxiliary member and the driving shaft 28 are no longer coupled the latter is adapted to move freely. This state is maintained as long as the driven shaft 36 is arrested or overloaded.

When the loading moment of this shaft decreases, so that it becomes smaller than the moment exerted by spring 41, relative displacement of the auxiliary member 34 and the driven shaft 36 takes place again but now because the shaft 36 is pulled near, as it were, by spring 41. Finally, upon this displacement of the shaft 36 the force exerted by spring 41 on the ratchet lever 38 changes its location and also its sign, so that the pawl and the roller are urged between the teeth gear wheel 35 and consequently the connection between the driving shaft 28 and the auxiliary member 34 is re-established. The spring 41 has relaxed until the auxiliary member 34 and the driven shaft 36 directly engage one another by means of the stop referred to, as a result of which the position shown in Fig. 5 is occupied again, and now the tension of spring 41 no longer affects the grip-roller coupling between the auxiliary member 34 and the housing 6, so that even a slight force is sufficient for urging the latter to its initial position, in which the cam 45 engages the left side of the recess 46.

In the majority of cases the contact spring of the contact device 49 cooperating with the arm 48 is capable of performing this, if not an additional spring may be provided. The movement to the left of the housing 27 results in that the contact device 49 is closed and the device is completely in the state existing prior to overloading.

The contact device 49 may be used for regulating the driving of shaft 36. On driving to this end in the shaft 28 by means of an electric motor the contact device 49 is included a supply lead to the motor. Since upon overloading of the shaft 36 not only the connection between this shaft and the driving shaft 28 is broken, but also the contact of the contact device 49 is opened the supply of energy to the motor is terminated upon overloading of the driven shaft, and the motor is allowed to slow down freely. When the overloading of the driven shaft ceases, the connection between the ingoing shaft and the outgoing shaft of the device is reestablished and at the same time the contact of the contact device 49 is closed, so that the motor is restarted.

What we claim is:

1. A transmission device comprising a driving part, a driven part, an automatically operating overload-release clutch coupling said driving and driven parts, said clutch coupling including a torque-transmitting auxiliary member, spring means connecting said auxiliary member to said driven part and means for coupling and uncoupling said auxiliary member to said driving part, said driven part continuing to be subjected after complete disengagement of the driving and driven parts subsequent to overload, to a driving force operating in the direction of movement followed prior to disengagement, a one-way coupling coupling said driving and driven parts in one direction of movement only, said one-way coupling comprising means for automatically uncoupling said driven part relative to said driving part when overload occurs.

2. A transmission device comprising a driving part, a driven part, an automatically operating overload-release clutch coupling said driving and driven parts, said clutch coupling including a torque-transmitting auxiliary member, spring means connecting said auxiliary member to said driven part and means for coupling and uncoupling said auxiliary member to said driving part, said driven part continuing to be subjected after complete disengagement of the driving and driven parts subsequent to overload, to a driving force operating in the direction of movement followed prior to disengagement, a one-way coupling coupling said driving and driven parts in one direction of movement only, said one way coupling comprising means for automatically uncoupling said driven part relative to said driving part when over-load occurs and an interruptible coupling in series with said one-way coupling.

3. A transmission device comprising a driving part, a driven part, an automatically operating overload-release clutch coupling said driving and driven parts, said clutch coupling including a torque-transmitting auxiliary member, spring means connecting said auxiliary member to said driven part and means for coupling and uncoupling said auxiliary member to said driving part, said driven part continuing to be subjected after complete disengagement of the driving and driven parts subsequent to overload, to a driving force operating in the direction of movement followed prior to disengagement, a one-way coupling coupling said driving and driven parts in one direction of movement only, said one way coupling comprising means for automatically uncoupling of said driven part relative to said driving part when overload occurs, said means including at least a pair of rotating elements, a ratchet gear coupling which permits one rotating element to always lag behind the other rotating element, an interruptible claw-type coupling in series with said one-way coupling, said interruptible coupling comprising two interchangeable parts, elastic means for maintaining said parts in engagement and means for applying pressure against said elastic means for disengaging said parts.

4. A transmission device comprising a driving part, a driven part, an automatically operating overload-release clutch coupling said driving and driven parts, said clutch coupling including a torque-transmitting auxiliary member, spring means connecting said auxiliary member to said driven part and means for coupling and uncoupling said auxiliary member to said driving part, said driven part continuing to be subjected after complete disengagement of the driving and driven parts subsequent to overload, to a driving force operating in the direction of movement followed prior to disengagement, a one-way coupling coupling said driving and driven parts in one direction of movement only, said one-way coupling comprising means for automatically uncoupling said driven part relative to said driving part when overload occurs, an interruptable coupling in series with said one-way coupling, said interruptable coupling comprising two interchangeable parts, spring means for maintaining said parts in engagement, manually displaceable means for applying pressure against said spring means for disengaging said parts, reset means to adjust said driven part, said reset means comprising a first gear on said driven part, a second gear operated by hand, said second gear being mounted co-axially with said interruptable coupling and coupled to said displaceable means so that upon disengagement of said coupling, said first and second gears are brought into engagement.

5. A transmission device comprising a driving part, a driven part, an automatically operating overload-release clutch coupling said driving and driven parts, said clutch coupling including a torque-transmitting auxiliary member, spring means connecting said auxiliary member to said driven part and means for coupling and uncoupling said auxiliary member to said driving part, said driven part continuing to be subjected after complete disengagement of the driving and driven parts subsequent to overload, to a driving force operating in the direction of movement followed prior to disengagement, a one-way coupling coupling said driving and driven parts in one direction of movement only, said one way coupling comprising means for automatically uncoupling said driven part relative to said driving part when overload occurs, an interruptable coupling in series with said one-way coupling and means for disengaging said interruptable coupling, said latter means, said interruptable coupling and said one-way coupling being located in a separate structural unit mounted laterally of the overload release clutch.

References Cited in the file of this patent
UNITED STATES PATENTS

| | | |
|---|---|---|
| 2,051,116 | Walsh et al. | Aug. 18, 1936 |
| 2,055,671 | Ridgeway | Sept. 29, 1936 |
| 2,548,207 | Dunn | Apr. 10, 1951 |
| 2,659,469 | Unk | Nov. 17, 1953 |